United States Patent [19]

De Buyl et al.

[11] Patent Number: 5,733,996
[45] Date of Patent: Mar. 31, 1998

[54] ORGANOSILOXANE COMPOSITIONS

[75] Inventors: Francois De Buyl; Patrick Leempoel, both of Brussels, Belgium

[73] Assignee: Dow Corning S.A., Seneffe, Belgium

[21] Appl. No.: 657,505

[22] Filed: Jun. 4, 1996

[30] Foreign Application Priority Data

Jun. 8, 1995 [GB] United Kingdom ............... 9512347
Apr. 17, 1996 [GB] United Kingdom ............... 9607985

[51] Int. Cl.$^6$ .................................. C08G 77/06
[52] U.S. Cl. ................. 528/17; 528/30; 528/33; 528/34
[58] Field of Search ............. 528/17, 30, 33, 528/34

[56] References Cited

U.S. PATENT DOCUMENTS

| | | | |
|---|---|---|---|
| 4,387,177 | 6/1983 | Mine et al. | 524/425 |
| 4,525,565 | 6/1985 | Laisney et al. | 528/17 |
| 4,525,566 | 6/1985 | Homan et al. | 528/17 |
| 4,530,882 | 7/1985 | Homan et al. | 428/452 |
| 4,585,705 | 4/1986 | Broderick et al. | 428/447 |
| 4,681,908 | 7/1987 | Broderick et al. | 524/268 |
| 4,743,474 | 5/1988 | Homan | 427/387 |
| 4,871,827 | 10/1989 | Klosowski et al. | 528/17 |
| 4,888,404 | 12/1989 | Klosowski et al. | 528/15 |
| 5,286,766 | 2/1994 | Arai et al. | 523/213 |

FOREIGN PATENT DOCUMENTS 4210349  10/1993  Germany.

*Primary Examiner*—Karen A. Dean
*Attorney, Agent, or Firm*—Roger H. Borrousch

[57] ABSTRACT

The specification describes and claims a composition curable in presence of atmospheric moisture to an elastomeric body, comprising (A) the product formed by mixing a polymeric material having at least two groups bonded to silicon which are hydroxyl or hydrolysable (eg alkoxy) groups and an alkoxysilane curative and (B) a compound according to the general formula $M[OR]_x[OR']_y$ where M represents a metal having a valency of 4 selected from Group IVB of the Periodic Table and is preferably titanium, x has a value from 0 to 1, y has a value from 3 to 4 and (x+y)=4, R' represents a monovalent tertiary aliphatic hydrocarbon group and R represents a monovalent linear aliphatic hydrocarbon group having 1 to 6 carbon atoms which is different from R'. Preferred compounds (B) are those in which R' represents $C(R^2R^3R^4)$ in which each of $R^2$, $R^3$ and $R^4$ represents a monovalent aliphatic chain having 1 to 6 carbon atoms, the most preferred groups R' being tertiary butyl and t-amyl groups. The compositions cure without need for the presence of a chelating agent and the preferred compositions cure quickly and do not yellow.

51 Claims, No Drawings

ORGANOSILOXANE COMPOSITIONS

This invention is concerned with moisture curable organosiloxane compositions which are curable to elastomers and also relates to the use of such compositions as sealing materials.

Organosiloxane compositions which cure to elastomeric solids are well known. Typically such compositions are obtained by mixing a polydiorganosiloxane having reactive terminal groups, generally silanol groups, with a silane cross-linking agent for the polydiorganosiloxane, for example an alkoxy silane, an acetoxy silane, an oxime silane or an amino silane. These materials are frequently curable upon exposure to atmospheric moisture at room temperature.

One important application of the above-described curable compositions is their use as sealants. In use as sealants, it is important that the composition is capable of curing in comparatively thick layers to provide an elastomeric body having a thickness greater than about 2 mm. It is frequently desirable that the composition cures quickly enough to provide a sound seal within several hours but not so quickly that the surface cannot be tooled to desired configuration shortly after application. Among specifically desirable attributes for such compositions are fast surface cure rate, good elasticity of the skin formed and lack of surface tackiness after curing for about 24 hours. Also, it has long been desired to have a clear, translucent or "water white" product which retains its translucency and lack of colour during use.

In order to achieve the desired speed of cure of alkoxy silane cured silicone compositions it has become a practice to employ certain organic titanium compounds as catalyst for the condensation reaction. Some of these titanium compounds are apt to react with methoxysilane to form a white precipitate in compositions containing them and this gives a discolouration and restricts the ability of the composition to cure. Also, the titanium compounds most generally preferred for this purpose are those derived from primary or secondary alcohols, for example, isopropylalcohol, n-butylalcohol. However, the titanium compounds employed in practice are often inadequate to promote a sufficiently rapid and/or deep cure and it is a practice to employ a chelating agent for example an acetyl acetonate as accelerator and stabilizer for the titanium compound. The acetyl acetonate may be mixed with the titanium compound or reacted with it to provide a complex. These materials containing acetonate inevitably lead to a cured silicone product which has a yellow tint. A solution to the problem of yellowing has been sought for many years but prior to the present invention it has not been known how to achieve the characteristics of desired speed of cure together with non yellowing with the alkoxy silane cured materials.

We have now found, surprisingly, that if one employs a member selected from a certain restricted class of compounds of an element having a valency of 4 and selected from Group IVB of the Periodic Table (for example titanium) one may provide alkoxysilane-cure silicone compositions curable at room temperature in presence of atmospheric moisture at a desired rate and to a desired thickness without the presence of acetyl acetonate accelerator/stabilizer and provide translucent, "water white" cured products.

The present invention provides in one of its aspects a moisture curable composition capable of cure to an elastomeric body comprising (A) the product formed by mixing a polymeric material having not less than two groups bonded to silicon which are hydroxyl or alkoxy groups, an alkoxysilane curative and (B) a compound according to the general formula $M[OR]_x[OR']_y$, where M represents a metal having a valency of 4 selected from Group IVB of the Periodic Table, x has an average value from 0 to 1, y has an average value from 3 to 4 and (x+y)=4, R' represents a monovalent, tertiary or branched-secondary aliphatic hydrocarbon group and R represents a monovalent linear aliphatic hydrocarbon group having 1 to 6 carbon atoms which is different from R'.

Also included within the scope of this invention are the cured elastomeric products of the said compositions and the use of such compositions for sealing joints, cavities and the like.

In a composition according to the invention, the polymeric material is according to the general formula X-A-X where A may be any desired organic or siloxane molecular chain for example a polyoxyalkylene chain or more preferably a polydiorganosiloxane chain and thus preferably includes siloxane units $R''_sSiO_{4-s/2}$ in which R'' represents an alkyl group having from 1 to 6 carbon atoms, for example a methyl group, a vinyl group or a phenyl group, or fluorinated alkyl group and s has a value of 0, 1 or 2. Preferred materials are linear materials i.e. s=2 for all units. Preferred materials have polydiorganosiloxane chains according to the general formula $—(R''_2SiO)_t—$ in which each R'' represents a methyl group and t has a value from about 200 to about 1500. Suitable materials have viscosities of the order of about 500 mPa.s to about 200,000 mPa.s. The groups X of the polymeric material are hydroxyl or alkoxy groups and may be selected, for example, from $—R''_2SiOH$, $—R''Si(OR^5)_2$, $—Si(OR^5)_3$, $—R''_2SiOR^5$ or $—R''_2SiR'''SiR''_p(OR^5)_{3-p}$ where R'' is as aforesaid, (and is preferably methyl), R''' is a divalent hydrocarbon group which may be interrupted by one or more siloxane spacers having up to six silicon atoms, $R^5$ is an alkyl or oxyalkyl group in which the alkyl groups have up to 6 carbon atoms and p has the value 0, 1 or 2.

In a composition according to the invention the alkoxysilane curative is of the general formula $R''_{4-n}Si(OR^5)_n$ wherein R'' and $R^5$ are as aforesaid and n has a value of 2, 3 or 4. Preferred silanes are those wherein R'' represents methyl, ethyl or vinyl, $R^5$ represents methyl or ethyl and n is 3. Examples of operative silanes are methyl tri(methoxy) silane (MTM), vinyl trimethoxy silane, methyl triethoxy silane, and vinyl triethoxy silane. A sufficient amount of this silane is employed to ensure adequate stability of the composition during storage and adequate crosslinking of the composition when exposed to atmospheric moisture.

The compound according to the general formula $M[OR]_x[OR']_y$ preferably is not present as a precipitate in the composition. It appears important that the group R' has a bulky structure i.e. tertiary or branched-secondary in order to minimise the tendency of the metal atom M to oligomerise via oxo bridge formation in between each other. A 4-coordinated metallic compound can thus be maintained as a stable species towards hydrolysis/condensation reaction under mild hydrolysis conditions. We thus avoid the use of acetyl acetonate ligand to stabilise the titanium ester catalyst, and thus avoid the yellowing discolouration, whilst enhancing the speed of cure performance. Preferably there are several such groups R'. Thus, in the compounds selected, we arrange that the identity and proportion of the R' groups are such that any tendency of the ligand groups attached to the titanium atom to associate with those of neighbouring molecules is reduced as compared with that achieved when the more usual titanate catalysts are employed. The group OR' is derived from a tertiary or branched-secondary alcohol i.e. a material which has a hydroxyl group and two or three carbon atoms, all attached to one carbon atom. In preferred materials R' represents $C(R^2R^3R^4)$ in which each of $R^2$, $R^3$ and $R^4$ preferably represents a monovalent aliphatic chain having 1 to 6 carbon atoms. The most preferred materials are those in which x=0 and y=4 and all the R' groups are tertiary aliphatic groups. Whilst M may represent any of the Group IVB elements namely Ti, Zr, Hf and Th of the actinide series, the preferred elements are titanium and hafnium, the most preferred being titanium. Thus, preferred compounds are according to the general formula

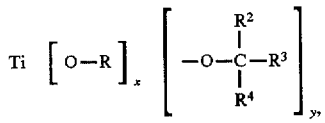

i.e. R' represents

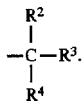

The most preferred materials are those in which two or more of $R^2$, $R^3$, and $R^4$ represent methyl groups any remaining one being an ethyl group i.e. those in which R' represents $C(CH_3)_3$ or $C(C_2H_5)(CH_3)_2$. The compound may be employed in conventional catalytic amounts i.e. from about 0.2 to 10 parts by weight per 100 parts by weight of the polymeric material. These titanium compounds are highly branched alkoxy titanate materials and may be prepared prior to compounding into the curable composition. Some of the preferred materials may also be prepared in situ in the composition. Preparation of the materials prior to incorporation into the composition may be carried out by reacting tetra-chloro-titanium ($TiCl_4$) or tetra-isopropoxy titanium (TiPT) with a selected branched-secondary or tertiary alcohol. Preferred materials are the tertiary alcohols e.g. tertio-butanol (R' is $C(CH_3)_3$) (referred to herein as $^tBuOH$) and tertio-amyl alcohol (R' is $C(C_2H_5)(CH_3)_2$) (referred to herein as $^tAmOH$). The reaction by-product, e.g. HCl or isopropyl alcohol, is preferably removed from the reaction medium to obtain the desired (tertio-alkoxy)-titanate. In the alkoxy exchange method, the starting material is preferably selected to ensure easy removal of the displaced alcohol by vacuum devolatilization. Thus the displaced alcohol should have a lower boiling point than the alcohol with which it is replaced. Accordingly, not all alkoxy titanates are suitable for use with all the preferred secondary or tertiary alcohols as will be apparent from inspection of the boiling points of the alcohols which may be considered. For example, the boiling points of isopropanol, tertio-butanol, tertio-amyl alcohol and n-butanol are 82° C., 83° C., 102° C. and 118° C. respectively. Reaction of tert-amyl alcohol is expected to be favourable with tetra isopropyl titanate (TiPT), tetra ethyl titanate (TEtT) or tetra methyl titanate (TMeT), whereas the reaction of tert-butyl alcohol is only favourable with TMeT. We have found that TiPT may be reacted with tert-amyl alcohol to form a titanium compound which can be shown by $^{13}C$ and $^1H$ NMR spectroscopy to be $Ti(O^tAm)_4$ with a purity close to 100%. In comparison, the reaction TiPT with tert-butyl alcohol to form the titanium compound $Ti(O^tBu)_4$ with the same purity is more difficult to achieve. Thus for this particular reaction,

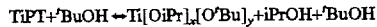

we have found that the ester interchange reaction has to be performed to an extent such that the purity of the compound is equal to or superior to 85 mole % Ti—($O^tBu$), in order to provide a titanium compound suitable for use as a catalyst in a composition according to this invention, to achieve the fast cure rate and tack free performance of layers of the composition of more than 2 mm thickness on a reasonable time scale. Thus, we prefer that the values of x and y in the formula $Ti[OiPr]_x[O^tBu]_y$ are in the ranges for x, of 0 to 0.6 and for y of 4 to 3.4. The most preferred compounds are those in which x is 0 and y is 4.

As mentioned above, it is possible to prepare certain of the preferred catalysts by an in-situ technique. This may be done by adding to a composition including certain appropriately selected conventional tetra-alkoxy-titanates, during the compounding of the composition, a tertiary or branched-secondary alcohol selected in accordance with the boiling point criteria mentioned above. Preferably, in this aspect, the conventional tetra-alkoxy-titanate comprises tetra-isopropyl-titanate and the highly branched alcohol comprises tertiary amyl alcohol, although $^tbutyl$ alcohol may also be used if higher temperature processing ($\bowtie$ 60° C.) and stripping are used. In order to provide a composition exhibiting a spectrum of properties in terms of rheology, cure, mechanical properties, adhesion and appearance, we prefer to employ not less than 4 molar equivalents of tert-amyl alcohol per mole of the conventional titanate employed.

Compositions according to the present invention containing the preferred catalyst materials but no co-catalyst and no chelating agent cure at an acceptably fast rate and give well cured translucent or water white elastomeric reaction products in thicknesses greater than 2 mm. If a more rapid cure is desired, a chelate, for example an acetyl acetonate, may be added to the mixture. Those acetyl acetonate materials conventionally used as accelerator/stabilizers for titanium catalysts may be employed, for example ethyl aceto acetate and methyl aceto acetate, but these also lead to yellowing of the product.

Compositions of this invention may contain as optional constituents other ingredients which are conventional to the formulation of silicone rubber sealants and the like. For example, the compositions will normally contain one or more finely divided, reinforcing or extending fillers such as high surface area fume and precipitated silicas, crushed quartz, diatomaceous earths, calcium carbonate, barium sulphate, iron oxide, titanium dioxide and carbon black. The proportion of such fillers employed will depend on the properties desired in the elastomer-forming composition and the cured elastomer. Usually the filler content of the composition will reside within the range from about 5 to about 150 parts by weight per 100 parts by weight of the polymeric material.

Other ingredients which may be included in the compositions are co-catalysts for increasing the rate of cure of the composition, pigments, plasticisers, agents (usually organo-silicon compounds) for treating fillers, rheological additives for improving toolability of the composition and adhesion improving substances for example γ-aminopropyl triethoxysilane. Suitable co-catalysts are well known in the art and include the metal salts of carboxylic acids, for example lead octoate and dibutyltin dilaurate, dibutyltin diacetate and stannous octoate. Another conventional ingredient which can be employed as a plasticiser and to reduce the modulus of the cured elastomer is a polydiorganosiloxane having terminal triorganosiloxy groups wherein the organic substituents are e.g. methyl, vinyl or phenyl or combinations of these groups. Such polydimethylsiloxanes normally have a viscosity of from about 100 to about 100,000 mPa.s at 25° C. and can be employed in amounts up to about 80 parts per 100 parts by weight of the polymeric material.

The compositions of this invention can be prepared by mixing the ingredients in any order and employing any suitable mixing equipment. It is generally preferred to add the titanium compound after mixing together the polymeric material and the curative silane and to add the tertiary alcohol thereafter if an in-situ preparation of the titanium compound catalyst of the invention is to be achieved. Any optional additional ingredients may be incorporated at any stage of the mixing operation but are preferably added after the catalyst. After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures. They have desired cure properties to provide cured seals of modulus sufficiently low for most industry standards and elongation to break which is sufficiently high for most industry standards.

In order that the invention may become more clear there now follows a description of example sealant compositions selected for description to illustrate the invention by way of example. In the description all parts are expressed by weight and all viscosities are at 25° C.

EXAMPLE 1

A Masterbatch sealant composition was prepared by mixing at room temperature in absence of moisture 70 parts of polymeric material (Polymer A), 4 parts of methyl trimethoxysilane (MTM), 6.6 parts of silica, 1 part of theological additive (B) and 13 parts of trimethylsilyl end-blocked polydimethylsiloxane fluid of viscosity 100 mPa.s (PDMS). The polymeric material was a polydimethylsiloxane of the formula $(OR^5)_3Si\text{---}R'''\text{---}SiR''_2\text{---}(R''_2SiO)_t\text{---}SiR''_2\text{---}R'''\text{---}Si(OR^5)_3$ in which $R^5$ represents ethyl, $R'''$ represents $C_2H_4$, $R''$ represents methyl and t has a value such that the polymer has a viscosity of about 60,000 mPa.s.

A comparative composition was made by mixing 94.6 parts of the Masterbatch, 1 part of methyltrimethoxysilane, 1.5 parts of tetra n-butoxy titanate (TNBT), 0.3 parts of a ethyl aceto acetate as chelating agent and 0.25 parts of an adhesion promoter (a mixture of γ-ethylenediaminopropyl trimethoxysilane and γ-glycidoxypropyl trimethoxysilane).

A first illustrative composition was prepared by mixing 94.6 parts of the Masterbatch, 1 part of methyltrimethoxysilane, 1.5 parts of tetra-tertiary-butoxytitanate (Ti—[O—C(CH$_3$)$_3$]$_4$) (T'BT), and 0.25 parts of the adhesion promoter (but no ethyl aceto acetate). A second illustrative composition was prepared by mixing 94.6 parts of the Masterbatch, 1 part of methyltrimethoxy silane, 1.75 parts of tetra-tertiary-amyloxy-titanate (Ti—[O—C(C$_2$H$_5$)(CH$_3$)$_2$]$_4$) (T'AMT), no chelate and 0.25 parts of the adhesion promoter.

Each of the compositions was extruded as a bead into a 310 ml cartridge from the mixer and stored therein for 7 days. Composition from each cartridge was used to provide cured samples from which various physical properties were determined according to standard test methods. Skin over time (SOT) was determined as the period of time during which the surface of an applied bead of the composition could be tooled or worked. Skin-Over-Time was measured by spreading the material to form a layer 0.32+/−0.08 cm thick on a clean smooth non porous surface. The sample was exposed the relative humidity of 50% RH at 25° C. At one minute intervals the surface was lightly touched with a finger tip and the finger slowly drawn away. This was repeated every minute until the sample did not adhere to the finger tip. The time in minutes elapsed from spreading the material until the surface did not adhere to the finger tip was recorded as Skin-Over-Time. Tack free time (TFT) was determined as the period of time elapsed after extrusion of a bead of the composition until the surface was no longer tacky to the touch. Tack-Free-Time was measured by spreading the material 2 mm thick on a clean smooth non porous surface. The sample was exposed to 50% RH at 22° C. At intervals of 5 minutes or less a clean polyethylene strip was laid on a fresh surface of the sample and gently pulled off. The time in minutes elapsed between spreading the sample and when the strip pulled away cleanly from the surface was recorded as the Tack-Free-Time. Skin elasticity was determined by extruding a bead of composition onto a substrate—exposing it to the ambient conditions i.e. typically 50% RH and 25° C. After a given period of time, typically 2 hours during which the bead has been allowed to cure, skin elasticity is evaluated by pulling in/pulling out with the fingers the skin that has been formed during these first two hours of cure. The resistance of the skin to cracking and its "elastic recovery" was evaluated and rated.

Rating:

0=poor and means that the skin that has been formed is so thin that it cracks at the first pulling-out/pulling-in action;

1=medium and means that some skin is formed, solid enough to resist to some early pulling-out/pulling-in movements;

2=good to excellent and means that a very elastic skin was formed during the first two hours of cure under the ambient conditions of cure, and that one may repeat the pulling-out/pulling-in action several times without observing cracking of the skin. Elastic recovery of the skin is also very good in that case.

Surface tackiness after 24 hours was determined by spreading material as for the SOT and TFT testing. The material was simply kept in place on the clean smooth non porous surface for 24 hours after it has been exposed to the ambient conditions of cure. The surface tackiness was then evaluated by applying the palm of the hand on the surface exposed to the air.

Rating:

0=bad i.e. very tacky after the 24 hours of cure: the material sticks on the hand;

1=medium i.e. tacking: one feels the material tacky to the hand, but force of adhesion between the material and the hand are too small to allow the sample to remain sticking to the hand;

2=excellent i.e. nearly non-tacking to touch after the 24 hours of cure and the material is totally cured in surface. Cure in depth (CID) was determined as the thickness in mm of the composition which was found to have cured to an elastomeric state during ageing at ambient temperature and humidity for a specified period. Colour of the cured material was determined from samples of the non-cured composition. Prior to testing, these samples were subjected to accelerated ageing in the cartridge at 70° C. for 1 week. The compositions were then applied between two glass plates (using a device for colour measurement associated with a Macbeth Color Eyes equipment) under room conditions of 23° C. and 50% relative humidity. The colour was measured in two ways namely by visual evaluation with the sample between the glass plates against a white surface in order to emphasise the "water white" (in the Tables "clear" signifies "colourless" or "water white") colour of the illustrative examples and the yellowish discolouration of the comparative composition and secondly by optical measurement. The second and more quantitative way of measuring discoloration effect was to get a numeric value (Db) of the yellowing on a yellow/blue scale i.e. the more yellow is the composition, the more positive is the Db value, while the more blue is the composition, the less positive is the Db value. It is important to compare the Db (yellowing index) values for compositions of a similar opacity (i.e. % of transmitted light through the sample) in order to avoid the influence of light scattering due to the presence of the reinforcing filler used in the composition. The Yellowing Index (YI) is defined according to the ASTM D1925 test method, which describes the yellowing in a yellow/blue scale: negative values (−)YI indicate a more bluish/clear formulation, while positive values (+)YI indicate a more yellowish composition. Testing was conducted as for the Db values. The results are shown in Table 1.

TABLE 1

| | Composition | | |
|---|---|---|---|
| Property | Comparative | First Illustrative | Second Illustrative |
| Cure Rate | | | |
| SOT (min) | 17 | 9 | 20 |
| TFT (min) | 38 | 41 | 50 |
| CID 48 Hr - mm | 2 | 2.1 | NT |
| Skin Elasticity | 2 | 2 | 2 |
| Surface Tackiness | 2 | 2 | 2 |
| Colour Visual by reflection | Yellow | Clear | Clear |
| Numeric by Colour Eye Equipment D bb | 8 | 3.7 | 3.6 |
| % opacity | 77.5 | 77.5 | 77.4 |
| YI | +8.2 | −10.9 | −10.5 |

From these results it can be seen that the illustrative compositions which employ the selected titanium compounds without chelating agent cure in a manner comparable to the Comparative composition but the cured materials are judged to be clear and non-yellowing.

EXAMPLE 2

Compositions were prepared by mixing together batches of ingredients employed in the compositions of Example 1 but in the quantities shown in Table 2. The compositions were evaluated as in Example 1 and the results are shown in Table 3. The chelating agent used was ethylacetoacetate and the co-catalyst used was dibutyl tin dilaurate.

TABLE 2

| | Composition | | | |
|---|---|---|---|---|
| | Comparative | | Illustrative | |
| Material | second | third | third | fourth |
| Polymer A | 70 | 70 | 70 | 70 |
| Fluid | 13 | 13 | 13.4 | 13 |
| MTM | 5.2 | 5.2 | 5.2 | 5.2 |
| TNBT | 1.5 | 1.5 | 0 | 0 |
| T'BT | 0 | 0 | 1.5 | 0 |
| T'AMT | 0 | 0 | 0 | 1.89 |
| Chelating Agent | 0.3 | 0 | 0 | 0 |
| Silica | 6 | 6 | 6 | 6 |
| Rheological additive | 1 | 1 | 1 | 1 |
| Adhesion promoter | 0.25 | 0.25 | 0.25 | 0.25 |
| Dibutyltin dilaurate | — | 0.08 | — | — |

TABLE 3

| | Composition | | | |
|---|---|---|---|---|
| | Comparative | | Illustrative | |
| Property | second | third | third | fourth |
| Cure Rate | | | | |
| SQT (min) | 65 | 72 | 60 | 10 |
| TFT (min) | 112 | 165 | 110 | 20 |
| CID 24 Hr (mm) | 2.51 | 2.51 | 2.94 | 3.19 |
| Skin Elasticity | 1 | 0 | 2 | 2 |
| Surface Tackiness | 2 | 0 | 2 | 2 |
| Colour Visual by reflection | Yellow | Clear | Clear | Clear |
| Numeric by Colour Eye Equipment D bb | 8.57 | 3.5 | 3.7 | 4.2 |
| % opacity | 71 | 70 | 71 | 70 |
| YI | +8.9 | −10.7 | −14.5 | −10.3 |

As can be seen from these results, the Comparative composition 2, which contained TNBT and a chelate, was a yellow product. Comparative composition 3 contained no chelate and was a clear product, but the catalyst system including the co-catalyst was inadequate to achieve a comparable cure and discoloured upon ageing under ambient conditions. The third and fourth illustrative compositions, which contained the preferred titanium compounds were clear and cured in an acceptable fashion.

EXAMPLE 3

A second Masterbatch sealant composition was prepared by mixing at room temperature in absence of moisture 70 parts of a second polymer (A2) 5.5 parts of methyl trimethoxysilane (MTM), 8 parts of fumed silica, 13 parts of PDMS, 0.6 parts of the promoter used in Examples 1 and 2 and 1 part of the rheological additive. The second polymer A2 was the same as the first polymeric (A) material but t had a value such that the polymer had a viscosity of about 80,000 $mm^2/s$.

Various proportions of titanium compounds were blended with this Masterbatch as reported in Table 4.

These titanium compounds were produced by reacting tetra isopropyl titanate $Ti(OiPr)_4$ with tertiary butyl alcohol to form titanium compounds Ti(OiPr)$_x$ (O$^t$Bu)$_y$ the alkoxy exchange was performed and repeated sufficiently to yield various compounds in which the values of x and y were varied.

The products were separated and used as the catalyst.

The compositions were tested as outlined above and as follows.

Penetration (mm/10) was measured by pouring a sample of the uncured composition into a cup. The pointer of a penetrometer was lowered onto the surface and its depth of penetration through the surface during 3 seconds was recorded as the Penetration.

Stringing (mm) was measured using a container filled with the sample and mounted on a lower clamp of a tensometer and a nozzle mounted on an upper clamp. To measure stringing the lower clamp was moved to cause the nozzle to dip into the sample to a depth of 20 mm. The lower clamp was then driven downward at 1000 mm per minute.

Modulus 100% (MPa), Elongation at Break (%) and Tensile Strength (MPa) were measured using a moulded and cured standard test slab 2 mm thick of each composition which had been cured by exposure to atmosphere at room temperature on a flat surface for at least 7 days. Tear strips were cut from the cured sample and stretched to breakpoint in a tensometer and the various measurements recorded.

Hardness (Shore A) was measured using a cured sample of the material and a durometer and the scale was read within 2 seconds after the foot was in firm contact with the sample.

Opacity (L) % was measured using a colour eye to view the transparency of a 6 mm thick sample sandwiched between two glass plates in comparison with the polymer matrix alone.

As can be seen from the results shown in Table 4 compositions B4 and B5 had excellent curing i.e. short skin over time and tack free time, fast formation of a highly elastic skin at the early stage of the cure and a fully tack-free-to-touch composition after the first 24 hours of cure and excellent non yellowing properties. In these compositions, the values for x in the general formula Ti(OiPi)$_x$(O$^t$Bu)$_y$ were 0.56 and 0.12 and the values for y were 3.44 and 3.88 respectively where (x+y)=4. When y is less than 3.40, clear products were obtained but the compositions displayed, less rapid curing to a tack free condition (TFT) and much slower development of an elastic and solid skin (SOT). The acceptable range of properties appears available when y=3(B3). When y is less than 3.00, and typically y=2.00 and 1.00 (composition B2 and B1 respectively), a clear product were also obtained, but the composition displayed much less rapid curing to a tack free material—if ever—and a very poor skin elasticity building-up was observed. Also, the compositions B4 and B5 showed good adhesion to various substrates.

TABLE 4

| Composition Reagent | B1 Parts | B2 Parts | B3 Parts | B4 Parts | B5 Parts |
|---|---|---|---|---|---|
| Polymer A2 | 70 | 70 | 70 | 70 | 70 |
| Fluid | 13 | 13 | 13 | 13 | 13 |
| MTM | 5.5 | 5.5 | 5.5 | 5.5 | 5.5 |
| Titanate Ti(OiPr)$_x$(O$^t$Bu)$_y$ | 2.10 | 2.20 | 2.2 | 2.34 | 2.38 |
| x = | 3.00 | 2.00 | 1.0 | 0.56 | 0.12 |

TABLE 4-continued

| Composition Reagent | B1 Parts | B2 Parts | B3 Parts | B4 Parts | B5 Parts |
|---|---|---|---|---|---|
| y = | 1.00 | 2.00 | 3.0 | 3.44 | 3.88 |
| Rheological Additive | 1 | 1 | 1 | 1 | 1 |
| Silica fumed | 8 | 8 | 8 | 8 | 8 |
| Adhesion Promotor | 0.6 | 0.6 | 0.6 | 0.6 | 0.6 |
| Physical properties | | | | | |
| • SOT | 38 | 35 | 10 | 4.5 | 4.5 |
| • TFT | 40* | 40* | 20 | 10 | 10 |
| • Skin Elasticity | 0 | 0 | 1 | 2 | 2 |
| • Tack after 24 hours | 0 | 0 | 1 | 2 | 2 |
| • CID @ 25 C.; 50% RH | 3 | 3 | 2.7 | 2.8 | 2.5 |
| • Stringing | 83 | 80 | 82 | 59 | 54 |
| • Penetration | 193 | 156 | 181 | 186 | 180 |
| • Tensile | 1.5 | 1.5 | 1.9 | 2 | 1.7 |
| • MOD100 | 0.58 | 0.64 | 0.64 | 0.63 | 0.65 |
| • EBreak | 287 | 280 | 328 | 356 | 305 |
| • Hardness | 24 | 25 | 25 | 26 | 27 |
| Colour Visual | Clear/ white | Clear/ white | Clear/ white | Clear/ white | Clear/ white |

*Poor quality skin and removed tacky after 24 hours

EXAMPLE 4

The ingredients of the second Masterbatch sealant composition were mixed in a batch process. Also included in the materials were tetra isopropyl titanate and tertiary amyl alcohol in the proportions shown in Table 5. In these compositions the alcohol was added before the TiPT, with the exception of A5 when the order of addition was reversed. The compositions were tested as referred to in the preceding Examples and the results are reported in Table 5. Comparative composition C contained a mixture of 1.5 parts TnBT and 0.30 parts ethyl aceto acetate as catalyst. As can be seen, composition C was yellow and composition A1 did not cure particularly well. The others, particularly compositions A3 and A5, demonstrated excellent cure characteristics as well as being water white. Similar results were obtained when the ingredients were supplied to and mixed in a twin screw extruder with temperatures of about 60° C. and extraction of by product alcohol from the extruder. It was assumed that compounds Ti(OiPr)$_x$(O$^t$Am)$_y$ were formed insitu with x<0.6 and y>3.4 where x+y=4.

TABLE 5

| Composition | C | A1 | A2 | A3 | A5 |
|---|---|---|---|---|---|
| Reagent | Parts | Parts | Parts | Parts | Parts |
| Polymer A | 70 | 70 | 70 | 70 | 70 |
| Fluid | 13 | 13 | 13 | 13 | 13 |
| MTM | 4 | 4 | | 4 | 4 |
| Tert-amyl alcohol | NA | 0.00 | 1.86 | 3.72 | 3.72 |
| N equiv = | NA | 0 | 4 | 8 | 8 |
| Catalyst TiPT Ti(OiPr)$_x$(O$^t$Am)$_y$ | — | 1.50 | 1.50 | 1.50 | 1.50 |
| x = | NA | 4 | 1.0 | 0.4 | 0.4 |
| y = | NA | 0 | 3.0 | 3.6 | 3.6 |
| Rheological Additive | 1 | 1 | 1 | 1 | 1 |
| Silica | 8 | 8 | 8 | 8 | 8 |
| Adhesion Promotor | 0.6 | 0.6 | 0.6 | 0.6 | 0.6 |
| Physical properties | | | | | |
| • SOT | 80 | 35 | 4 | 1.2 | 2 |
| • TFT | 90 | 45 | 15 | 7 | 7 |
| • Skin Elasticity | 0 | 0 | 1 | 2 | 2 |
| • Tack after | | | | | |

TABLE 5-continued

| Composition | C | A1 | A2 | A3 | A5 |
|---|---|---|---|---|---|
| Reagent | Parts | Parts | Parts | Parts | Parts |
| 24 hours | 0 | 0 | 1 | 2 | 2 |
| • CID | 3.8 | 4.5 | 4.3 | 4.2 | 4.5 |
| • Stringing | 61 | 77 | 56 | 39 | 57 |
| • Penetration | 107 | 146 | 137 | 142 | 143 |
| • Tensile | 1.99 | 1.50 | 1.55 | 1.80 | 1.46 |
| • MOD100 | 0.65 | 0.46 | 0.52 | 0.54 | 0.53 |
| • EBreak | 350 | 393 | 402 | 434 | 375 |
| • Hardness | 25 | — | — | — | — |
| Colour | Yellow | Clear | Clear | Clear | Clear |
| Opacity | 86 | 83 | 86 | 83 | 80 |

That which is claimed is:

1. A moisture curable composition capable of cure to an elastomeric body, comprising (A) the product formed by mixing a polymeric material having at least two groups bonded to silicon which are hydroxyl or alkoxy groups and an alkoxysilane curative and (B) a compound according to the general formula $M[OR]_x[OR']_y$ where M represents a metal having a valency of 4 selected from Group IVB of the Periodic Table, x has an average value from 0 to 1, y has an average value from 3 to 4 and (x+y)=4, R' represents a monovalent tertiary aliphatic hydrocarbon group and R represents a monovalent linear aliphatic hydrocarbon group having 1 to 6 carbon atoms which is different than R'.

2. A moisture curable composition according to claim 1 wherein M represents titanium.

3. A moisture curable composition according to claim 1 wherein R' represents $C(R^2R^3R^4)$ in which each of $R^2$, $R^3$ and $R^4$ represents a monovalent aliphatic chain having 1 to 6 carbon atoms.

4. A moisture curable composition according to claim 2 wherein R' represents $C(R^2R^3R^4)$ in which each of $R^2$, $R^3$ and $R^4$ represents a monovalent aliphatic chain having 1 to 6 carbon atoms.

5. A moisture curable composition according to claim 3 wherein R' is selected from the group consisting of tertiary butyl and t-amyl.

6. A moisture curable composition according to claim 4 wherein R' is selected from the group consisting of tertiary butyl and t-amyl.

7. A moisture curable composition according to claim 1 wherein R represents the isopropyl group.

8. A moisture curable composition according to claim 1 wherein the catalyst material consists solely of

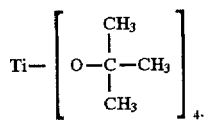

9. A composition according to claim 1 wherein the polymeric material is an at least substantially linear polydiorganosiloxane having terminal groups selected from the groups $SiMe_2OH$ and $SiMe_2R'''Si(OR)_3$.

10. A moisture curable composition according to claim 9 wherein M represents titanium.

11. A moisture curable composition according to claim 9 wherein R' represents $C(R^2R^3R^4)$ in which each of $R^2$, $R^3$ and $R^4$ represents a monovalent aliphatic chain having 1 to 6 carbon atoms.

12. A moisture curable composition according to claim 10 wherein R' represents $C(R^2R^3R^4)$ in which each of $R^2$, $R^3$ and $R^4$ represents a monovalent aliphatic chain having 1 to 6 carbon atoms.

13. A moisture curable composition according to claim 11 wherein R' is selected from the group consisting of tertiary butyl and t-amyl.

14. A moisture curable composition according to claim 12 wherein R' is selected from the group consisting of tertiary butyl and t-amyl.

15. A moisture curable composition according to claim 9 wherein R represents the isopropyl group.

16. A moisture curable composition according to claim 9 wherein the catalyst material consists solely of

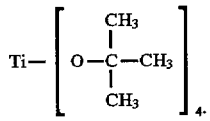

17. A composition according to claim 1 wherein the alkoxysilane is methyl trimethoxysilane.

18. A moisture curable composition according to claim 17 wherein M represents titanium.

19. A moisture curable composition according to claim 17 wherein R' represents $C(R^2R^3R^4)$ in which each of $R^2$, $R^2$ and $R^4$ represents a monovalent aliphatic chain having 1 to 6 carbon atoms.

20. A moisture curable composition according to claim 18 wherein R' represents $C(R^2R^3R^4)$ in which each of $R^2$, $R^3$ and $R^4$ represents a monovalent aliphatic chain having 1 to 6 carbon atoms.

21. A moisture curable composition according to claim 19 wherein R' is selected from the group consisting of tertiary butyl and t-amyl.

22. A moisture curable composition according to claim 20 wherein R' is selected from the group consisting of tertiary butyl and t-amyl.

23. A moisture curable composition according to claim 17 wherein R represents the isopropyl group.

24. A moisture curable composition according to claim 17 wherein the catalyst material consists solely of

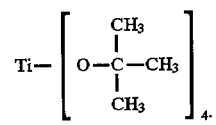

25. A composition according to claim 7 also comprising finely divided filler.

26. A moisture curable composition according to claim 25 wherein M represents titanium.

27. A moisture curable composition according to claim 25 wherein R' represents C $(R^2R^3R^4)$ in which each of $R^2$, $R^3$ and $R^4$ represents a monovalent aliphatic chain having 1 to 6 carbon atoms.

28. A moisture curable composition according to claim 26 wherein R' represents $C(R^2R^3R^4)$ in which each of $R^2$, $R^3$ and $R^4$ represents a monovalent aliphatic chain having 1 to 6 carbon atoms.

29. A moisture curable composition according to claim 27 wherein R' is selected from the group consisting of tertiary butyl and t-amyl.

30. A moisture curable composition according to claim 28 wherein R' is selected from the group consisting of tertiary butyl and t-amyl.

31. A moisture curable composition according to claim 25 wherein R represents the isopropyl group.

32. A moisture curable composition according to claim 25 wherein the catalyst material consists solely of

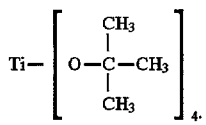

33. A composition according to claim 25 wherein the finely divided filler is predominantly silica.

34. A moisture curable composition according to claim 33 wherein M represents titanium.

35. A moisture curable composition according to claim 33 wherein R' represents $C(R^2R^3R^4)$ in which each of $R^2$, $R^3$ and $R^4$ represents a monovalent aliphatic chain having 1 to 6 carbon atoms.

36. A moisture curable composition according to claim 34 wherein R' represents $C(R^2R^3R^4)$ in which each of $R^2$, $R^3$ and $R^4$ represents a monovalent aliphatic chain having 1 to 6 carbon atoms.

37. A moisture curable composition according to claim 35 wherein R' is selected from the group consisting of tertiary butyl and t-amyl.

38. A moisture curable composition according to claim 36 wherein R' is selected from the group consisting of tertiary butyl and t-amyl.

39. A moisture curable composition according to claim 33 wherein R represents the isopropyl group.

40. A moisture curable composition according to claim 33 wherein the catalyst material consists solely of

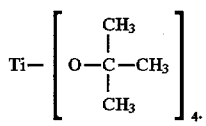

41. A method of forming an elastomeric mass between surfaces which is adherent to at least two such surfaces which method comprises introducing between the surfaces a mass of a moisture curable composition comprising (A) the product formed by mixing a polymeric material having at least two groups bonded to silicon which are hydroxyl or hydrolysable groups, and an alkoxysilane curative, and (B) a catalyst material for catalysing the condensation reaction between the polymeric material and the alkoxysilane curative which catalyst material comprises a compound according to the general formula $M[OR]_x[OR']_y$ where M represents a metal having a valency of 4 selected from Group IVB of the Periodic Table, x has an average value from 0 to 1, y has an average value from a 3 to 4 and (x+y)=4, R' represents a monovalent tertiary aliphatic hydrocarbon group and R represents a monovalent linear aliphatic hydrocarbon group having 1 to 6 carbon atoms which is not a group R'.

42. A method according to claim 41 wherein M represents titanium.

43. A method according to claim 41 wherein R' represents $C(R^2R^3R^4)$ in which each of $R^2$, $R^3$ and $R^4$ represents a monovalent aliphatic chain having 1 to 6 carbon atoms.

44. A method according to claim 42 wherein R' represents $C(R^2R^3R^4)$ in which each of $R^2$, $R^3$ and $R^4$ represents a monovalent aliphatic chain having 1 to 6 carbon atoms.

45. A method according to claim 43 wherein R' is selected from the group consisting of tertiary butyl and t-amyl.

46. A method according to claim 44 wherein R' is selected from the group consisting of tertiary butyl and t-amyl.

47. A method according to claim 41 wherein R represents the isopropyl group.

48. A method according to claim 41 wherein the catalyst material is formed by chemical reaction between a tetra alkoxy titanium compound and a tertiary alcohol.

49. A method according to claim 41 wherein the chemical reaction to produce the catalyst material is brought about in the preparation of the product (A).

50. A composition according to claim 1 wherein the catalyst material is formed by chemical reaction between a tetra alkoxy titanium compound and tertiary alcohol.

51. A composition according to claim 50 wherein the chemical reaction to produce the catalyst material is brought about in the preparation of the product (A).

* * * * *